United States Patent [19]

Murphy et al.

[11] Patent Number: 5,054,621

[45] Date of Patent: Oct. 8, 1991

[54] DOCUMENT SORTING APPARATUS

[75] Inventors: Gary J. Murphy, Birmingham, Ala.; Derrick L. Murphy; Michael J. Murphy, both of Middletown, Md.; Michael Barnes, Frederick, Md.

[73] Assignee: Hybrid Systems, Inc., Birmingham, Ala.

[21] Appl. No.: 451,925

[22] Filed: Dec. 18, 1989

[51] Int. Cl.$^5$ .............................................. B07C 5/00
[52] U.S. Cl. ................................... 209/534; 209/583; 209/912
[58] Field of Search ............... 209/534, 583, 584, 900, 209/912; 271/280, 281, 82, 204, 205, 277, 298; 198/803.8, 372

[56] References Cited

U.S. PATENT DOCUMENTS

| | | | |
|---|---|---|---|
| 1,462,923 | 7/1923 | Stevens | 271/204 |
| 3,171,535 | 3/1965 | Harris | 198/803.8 |
| 3,889,811 | 6/1975 | Yoshimura | 209/900 X |
| 4,373,713 | 2/1983 | Loebach | 271/303 |
| 4,500,002 | 2/1985 | Koshio et al. | 209/534 |
| 4,566,687 | 1/1986 | Faltin | 271/204 X |

FOREIGN PATENT DOCUMENTS 3605534 8/1987 Fed. Rep. of Germany ...... 271/205

Primary Examiner—Margaret A. Focarino
Assistant Examiner—Dean J. Kramer
Attorney, Agent, or Firm—Eugene F. Osborne

[57] ABSTRACT

A document sorting and stacking device provides for automated processing of randomly assembled batches of sheet items or objects such as negotiable instruments, currency, data cards, envelopes and the like which are fed into the unit in a continuing sequential progression for their separation and stacking, each in one of the designated multiple pockets. The motor driven transport conveyor of the unit moves the objects through the device at a known speed. If an object is "tagged" to enter a particular pocket, a computing microprocessor controls a step-motor to advance a sorting belt to extend one of its capture fingers into the transport path for rendezvous with the object. As the belt is advanced further the capture finger closes upon the object and the belt pulls it forward for deposit in the designated stacking pocket. If the object is not "tagged" for the pocket, the microprocessor holds the sorting belt in a position that hides the tip of a capture finger behind a parking paw to preclude rendezvous with the advancing object which then passes on to the next sorting and stacking stage of the device.

15 Claims, 5 Drawing Sheets

DOCUMENT SORTING APPARATUS

BACKGROUND OF THE INVENTION

1. Field of the Invention

This invention relates to automated sorting and stacking machines for sheet documents, data cards negotiable instruments, postal envelopes and the like, characterized by varying thicknesses, dimensions, textures or surface finishes. Applications are anticipated in commerce and industry generally where high volume operations are routine such as occur in banks and similar financial institutions, in postal services, in communication and shipping industries.

2. Description of Related Art

In the daily operation of many institutions it is necessary to process large quantities of similar articles or documents according to diverse coded information appearing thereon such as an account number, an address or destination code, for examples. In typical automated systems a randomly assembled batch of documents, etc. is fed through a processing path, in sequential order, for identification, perhaps by an optical character reader of encoded data on each document, then for individual separation from the flow path for transport to an assigned stacking bin or cavity pocket designated for that specific account or destination. A multiplicity of sorting and stacking channels is generally required for efficient processing. Obviously, by recycling of the remainder of a random batch of documents, at the expense of time and wear of the apparatus and documents, a single sorting and stacking apparatus can eventually process an entire batch of documents; however, a multiplicity of simultaneously operative sorting and stacking machines is desired for practical and efficient operations.

SUMMARY OF THE INVENTION

In this invention a computer, in conjunction with real time electro-optical monitoring devices, controls the mechanical apparatus that selects or captures specific documents from a continuing flow of documents that are passing along a transfer path in sequential order for a randomly assembled batch. The computer controls the acceleration of the captured document according to a time profile curve as it is pulled along an off-side diverter path to reach the back stop wall of a stacking pocket. Other documents of the sequential progression in the transfer path that are not diverted pass on for capture by the next or succeeding stages of a multiple sorting and stacking processing system. The documents pass along the transport path at a predetermined speed established by motor driven conveyor belt(s) and idle rollers distributed along guideways of the transport path.

The invention embodies an endless multiple fingered sorting belt for capture and delivery of object documents to the designated stacking pocket. This sorting belt is operated in its forward direction by a computer controlled electric stepping motor. In its manufacture the capture fingers of the sorting belt are biased to normally point inward from the inside planar surface of the thin film strip. As installed in the mechanical assembly the belt wraps around a pickup roller of a small circumference relative to the perimeter of the belt. Unless otherwise inhibited by a mechanical means, each capture finger of the belt normally pointing inward, when adjacent to the arc of the pickup roller then shift automatically to point outward from the outside planar surface of the belt. Placement of the pickup roller, with an associated directional shift inhibiting paw that restrains the outward shift of the capture fingers, adjacent to the document transfer path creates opportunities for selecting specific items from a continuing flow of documents.

Normally, until an object document is identified for capture and stacking the endless sorting belt is stationary in a parking mode. Once a "target" document, traveling in the unit document path, is identified, the computer processor estimates the time of arrival for its leading edge at the point for capture and initiates the stepping motor to advance the sorting belt so that a capture finger of the belt escapes the restraint provided by the inhibiting paw and projects into the path for a timed rendezvous with the oncoming "target" document. The endless belt accompanied by the intercepted "target" is then accelerated for moving into a strait zone of the belt, as maintained by a tensioning subsystem, wherein the inward bias of the capture fingers closes upon the document and provides the grasping force for holding the "target" document by its leading edge. The advancing belt pulls the document to the end wall of the stacking pocket where it is stripped and motion of the belt ceases in a parking mode, i.e., without a capture finger projecting into the document path, until the electro-optical system identifies the "next target" for diversion and stacking.

In general, the object of this invention is to provide an improved apparatus and system for high speed automated sorting and stacking of individual documents from a randomly mixed batch.

Another object of this invention is to provide a system with apparatus having a multiplicity of stacking stages for documents from a randomly mixed batch according to data processing unique addressing codes.

Another object of this invention is to provide apparatus having capabilities for sorting and stacking documents of varying dimensions, thicknesses, pliancy, textures, finishes and similar parameters.

Another object of this invention is to improve the reliability of operation and durability of the apparatus.

Another object of this invention is to achieve high speed sorting of documents, reliably, with the elimination of solenoid (mechanically) actuated document deflectors or capturing devices.

Yet another object of this invention is to provide apparatus having a low operating noise level for office environments.

Upon study of the specification, drawings and appended claims, further objects, features and advantages of this invention will become more fully apparent to the reader skilled in the art to which this invention pertains.

BRIEF DESCRIPTION OF THE DRAWINGS

The description of the present invention is written in connection with the accompanying drawings of preferred embodiments, in which.

DETAILED DESCRIPTION OF THE INVENTION

Figure 1:
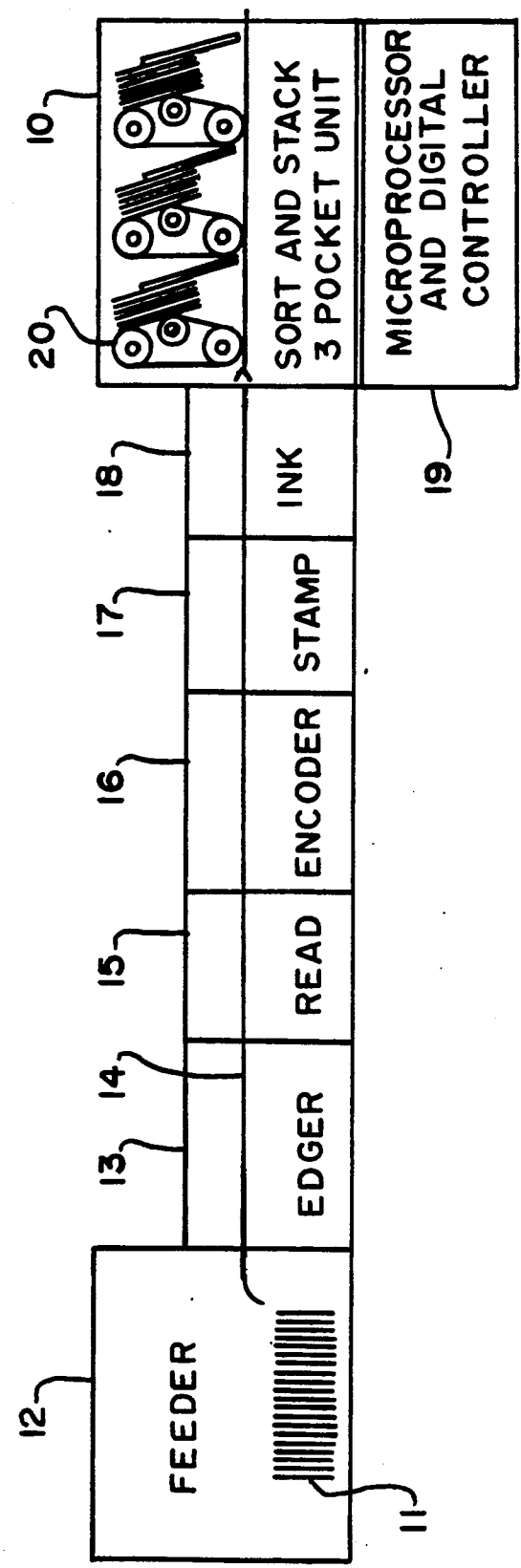
FIG. 1 is a block diagram and symbolic representation of a document processing and sorting system.

Referring now to the drawings, FIG. 1 illustrates a typical document processing system as may be employed in commercial or financial institutions showing the application of the sorting apparatus 10 in an automated office environment for document processing. In the presently preferred embodiment three stages of sorting and stacking apparatus are assembled as a unit 10 and a multiplicity of such units 10 may be cascaded in a major high volume office document processing operation.

A randomly mixed batch 11 of documents, mixed according to their address, account destination, or other similar identification, is assembled in a feeder mechanism 12 for their sequential delivery, one by one, to a document alignment edger 13 and conveyor 14 mechanism which continues through customer specified apparatus such as the character reader 15, encoder 16, stamp 17, and (ink) jet printer 18, typically, for delivery to one or more sorting and stacking unit(s) 10. Multiple technologies in the mechanical, electrical, optical, data processing and computing arts are involved in the design and operation of the sorting and stacking unit 10. The following description applies to all of the stages and units which may be incorporated in a document processing system.

Figure 2:
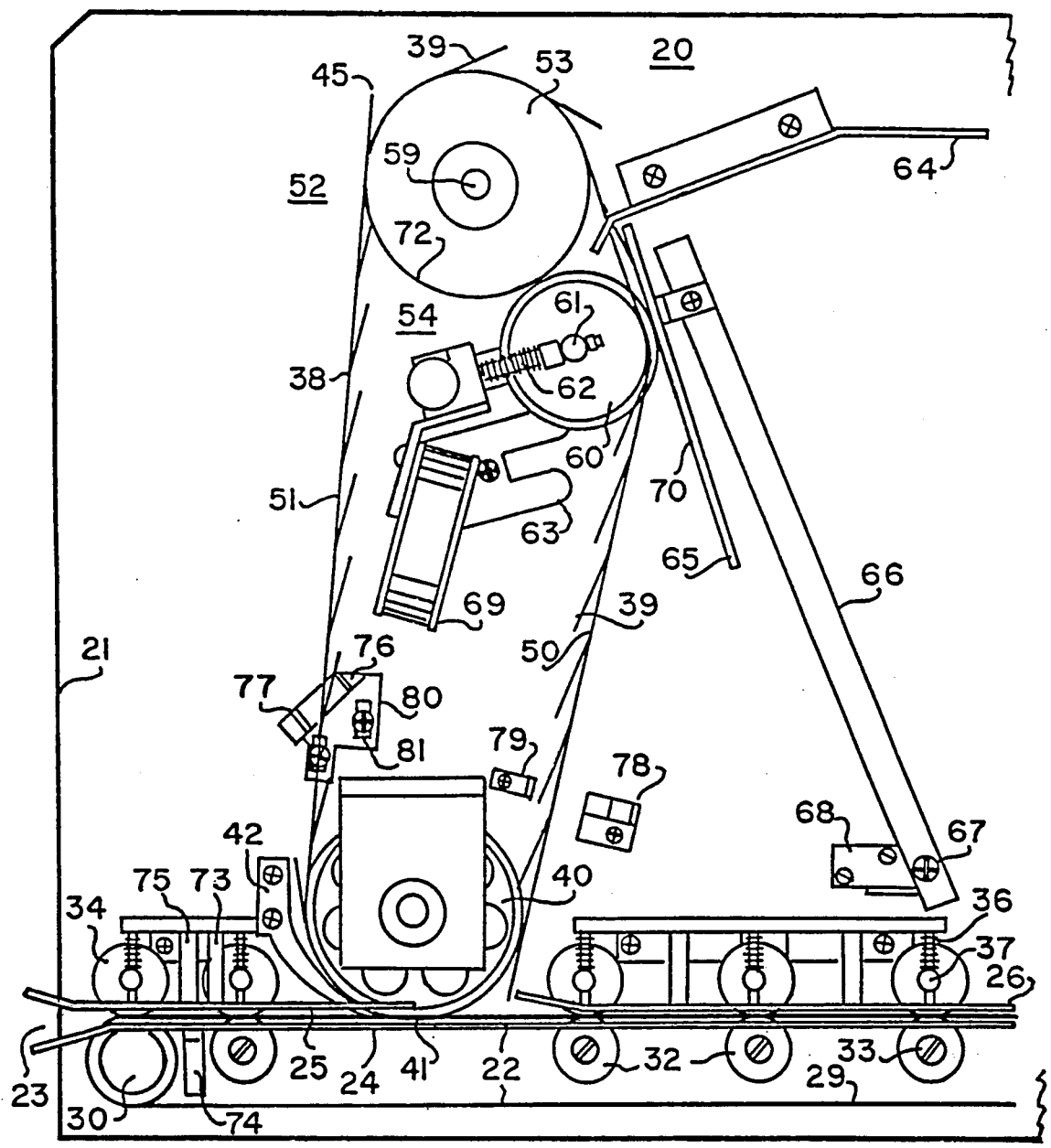
FIG. 2 is a topside plan view of a portion of a mechanical assembly for sorting and stacking documents in its parking mode.
Figure 4:
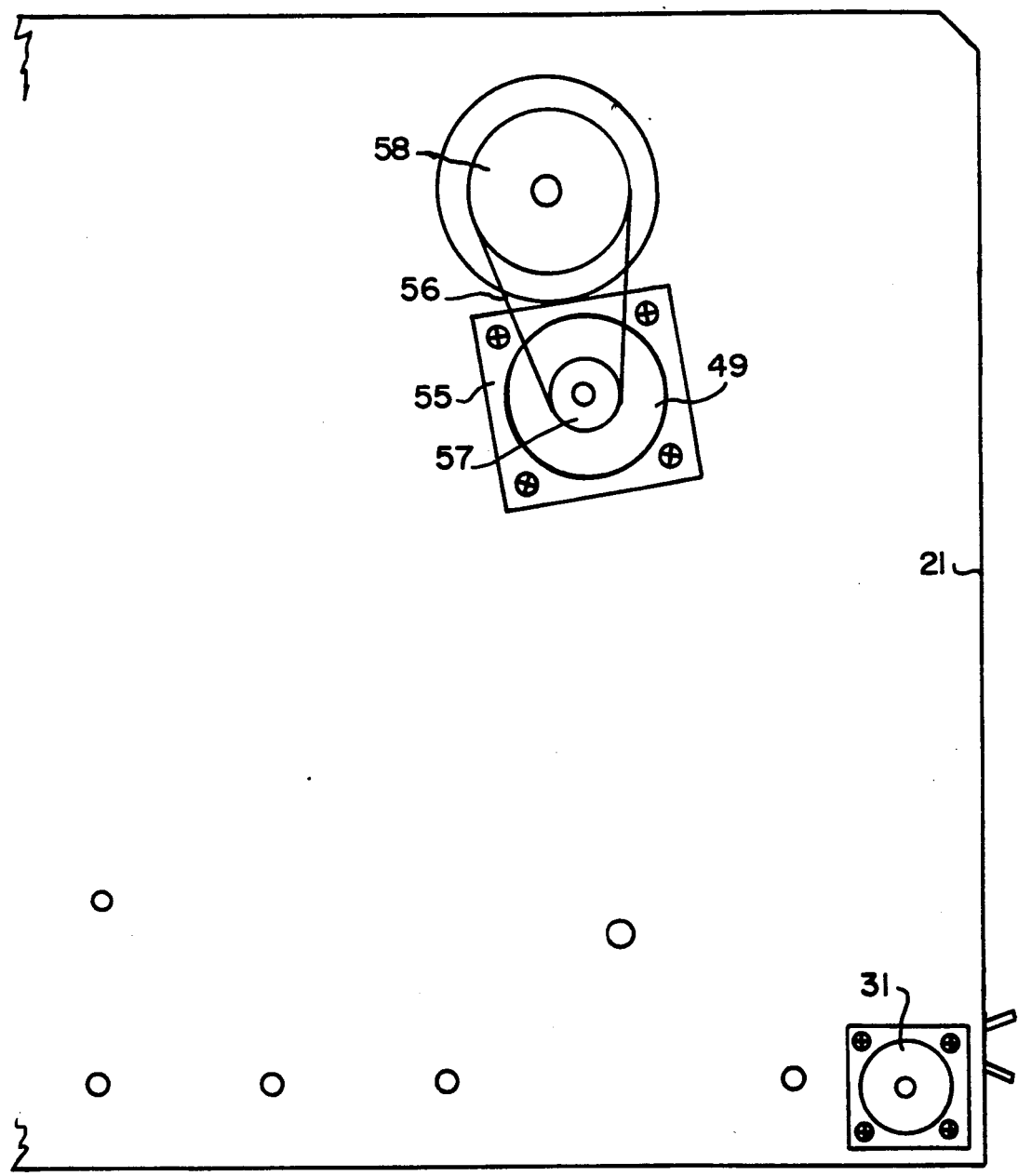
FIG. 4 is a bottom side plan view of the apparatus illustrated in FIG. 2.

In FIG. 2 a portion of the mechanical apparatus (from a top plane view) of a single stage sorting and stacking device 20 is shown assembled to a two dimensional plate 21. (A portion of the components are assembled to the under surface of the plate 21, FIG. 4.) The mounting plate 21 and independent unit conveyor 22 serve each of the three stages forming the three pocket sorter 10. Documents from the system feeder 12 travel through the processing system via the transport conveyor 14, and are received at the sorting unit 10. They continue along a document path 23 (from left to right in FIGS. 2 and 8) formed by a long constraining guide 24, a short parallel entry guide 25, intermediate guides 26, and 27, and a short exit guide 28. Aligned with the document path 23 is the unit conveyor belt 29 which is driven at a calibrated constant speed by the conveyor drive wheel 30 and electric motor 31. In contact with the inner surface of the unit conveyor belt 29 a multiplicity of idle rollers 32 is distributed, each rotating upon its rigid axle 33. Immediately opposite the conveyor drive wheel 30 and each of the inner idle rollers 32 is a companion floating idle roller 34 which, in the absence of a passing document 35, rotates in contact with the outer surface of the unit conveyor belt 29 under the force of dual springs 36 upon the floating axles 37. For each companion pair of idle rollers 32 and 34 the respective rigid axle 33 and floating axle 37 lie (approximately) in a plane orthogonal to the document path 23 and the assembly plate 21. The drive motor 31 is mounted on the opposite or bottom side of the assembly plate 21 away from the belt drive wheel 30. The conveyor belt 29 is a flat woven fabric coated with polyurethane.

Figure 3:
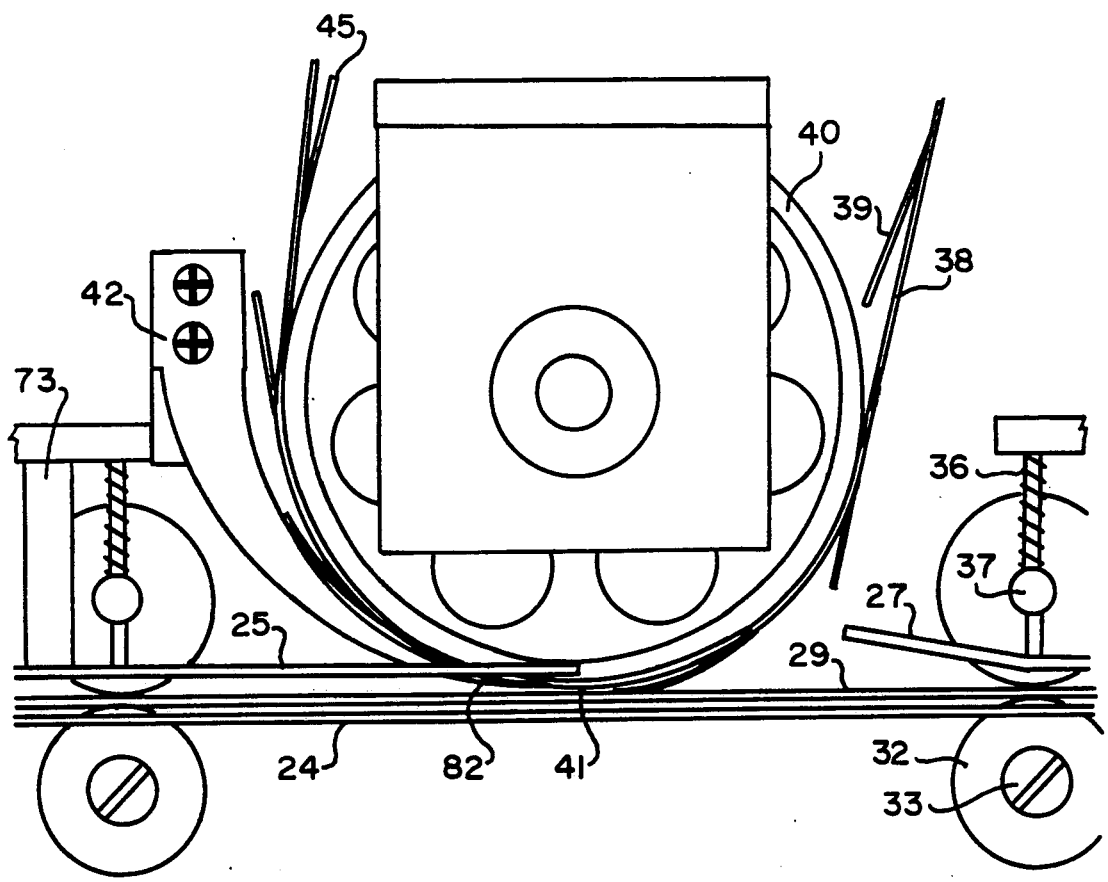
FIG. 3 is an enlarged topside plan view of a portion of the mechanical apparatus of FIG. 2 showing the document transport path and pick roller subassembly.
Figure 8:
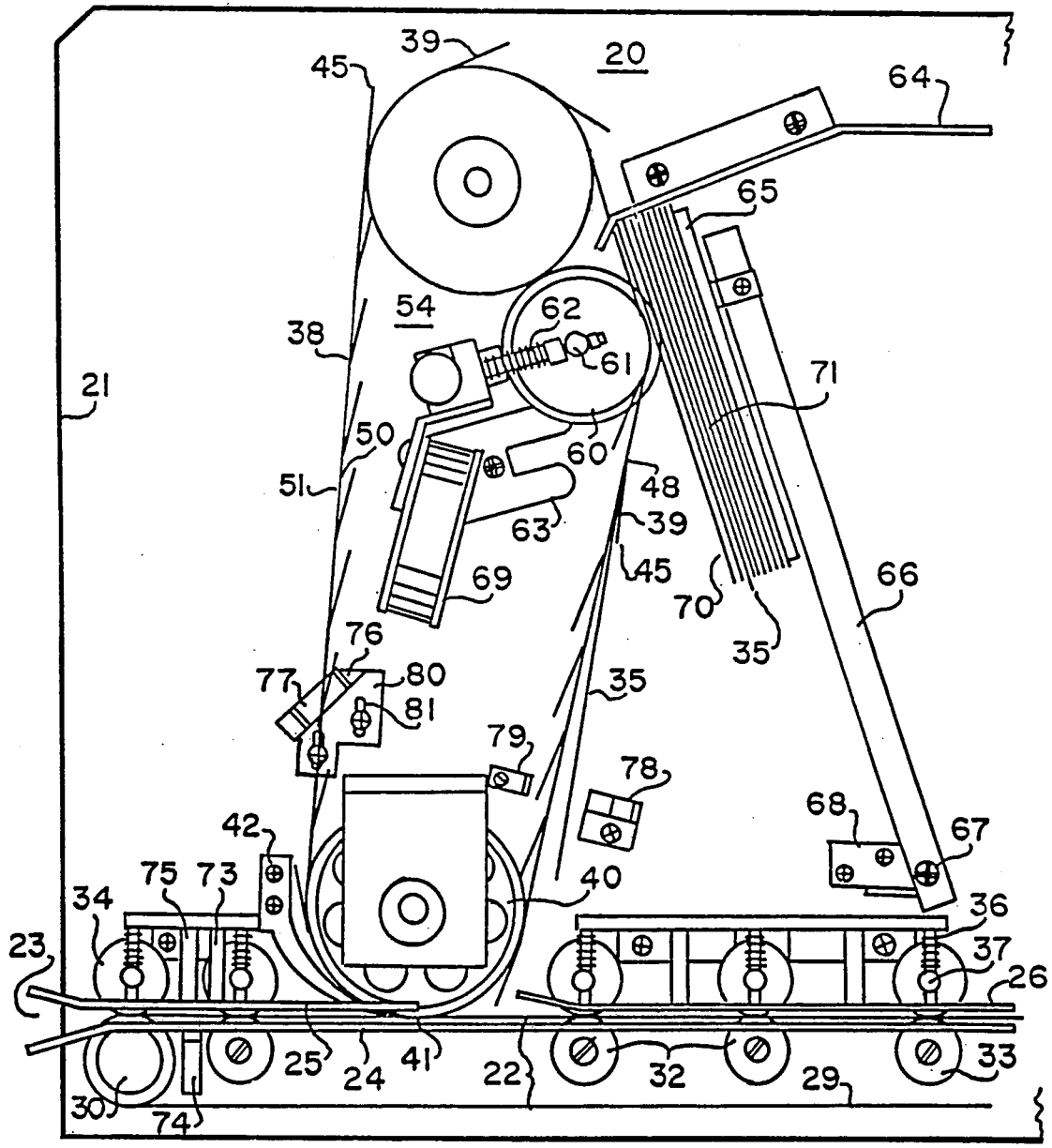
FIG. 8 illustrates a captured document in transit to the stacking pocket showing the apparatus of FIG. 2.

Continuing with FIGS. 2, 3 and 8 the document sorting subsystem centers on a unique endless polyester film sorting belt 38 which has a multiplicity of capture fingers 39. When the belt 38 is in a relaxed state or when it is under tension to form straight segments each of the capture fingers 39 is biased in the manufacture of the belt 38 to point inward at an acute angle from the inner surface of the belt 38. When a segment of the belt 38 is forced to conform to a circular shape by riding, for example, upon the rim of a wheel or roller then by deformation of that segment so constrained the fingers 39 within that segment shift to point at an acute angle projecting outward from the outer surface of the belt 38. As the belt 38 is driven the fingers 39, normally inward, shift outward on entering the circular zone and shift back inward on entering straight zones, assuming no applied restraints. When a document 35 is interposed between an outward projecting finger 39 and the outer surface of the belt 38, then upon entry into a straight zone the inward bias of the finger 39 (which is then prevented from returning inward by the interposed document 35) provides a grasping force to pull the document 35 along with the travel of the belt 38.

Thus the document sorting apparatus is assembled with a pick roller 40 and circumscribed belt 38 thereabout, arranged so that unrestrained fingers 39 may project outward into the adjacent unit document flow path 23, approximately at the point of tangency 41. On the oncoming side of the pick roller 40 a parking paw 42 is provided to constrain capture fingers 39 of a stationary belt 38, in the parking mode, from projecting into the document path 23 so that documents 35 may pass by. The parking paw 42 restraint extends approximately to the point of tangency 41. If the belt 38 is advanced so that a finger 39 escapes the restraint of the parking paw 42 then that finger 39 projects into the document path 23 and an opportunity exists for capture of an arriving document 35.

Figure 5:
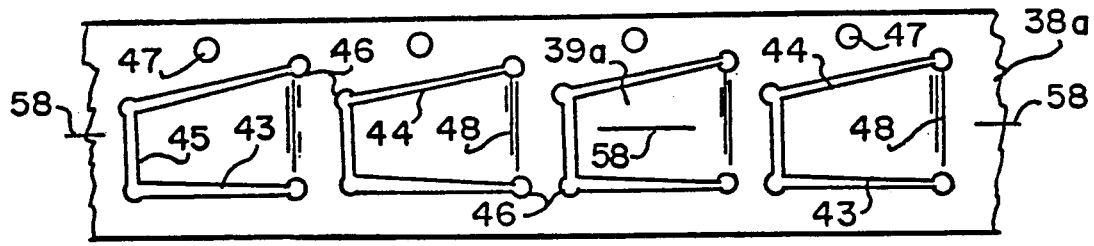
FIG. 5 is a plan view of the outside surface of a preferred document stacker belt shown in segment.
Figure 7:
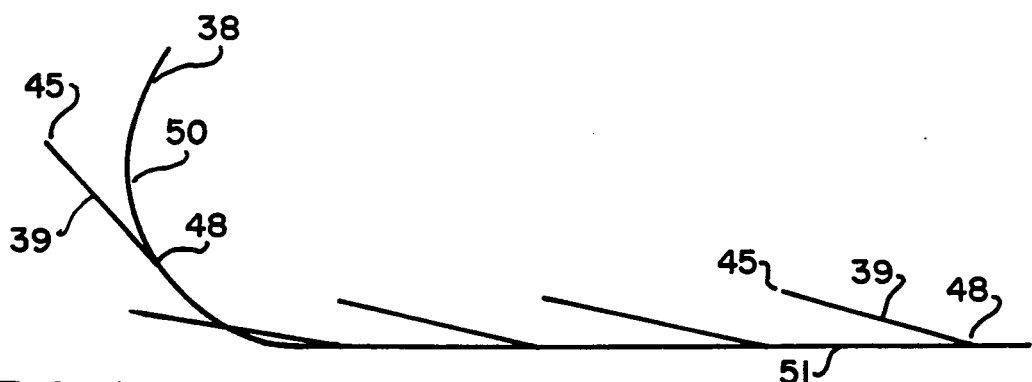
FIG. 7 is an edgewise view of a segment of the document stacker belts shown in FIGS. 5 and 6.
Figure 6:
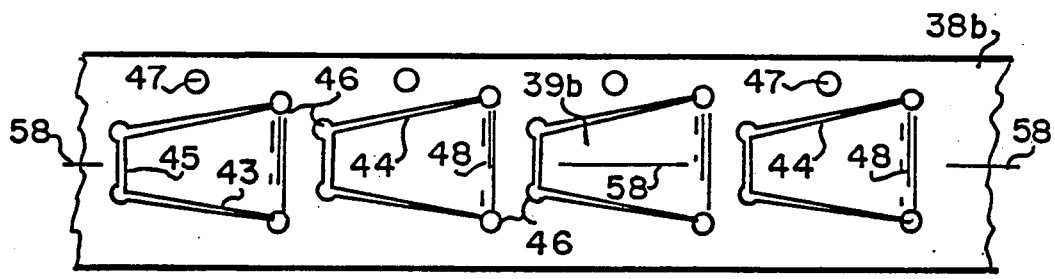
FIG. 6 is a plan view of the outside surface of an alternate symmetrical document stacker belt shown in segment.

FIGS. 5–7 show segments of typical sorting belts 38. A plan view of a segment of an asymmetrical sorting belt, 38a, preferred for capture and stacking of thin sheet objects having broad width dimensions is seen in FIG. 5, where the asymmetric finger 39a has a first side edge 43 that is parallel to the edges of the asymmetric belt 38a. The asymmetric finger 39a has edge 45 joining the parallel first side edge 43 to the second side edge 44 which is tapered inward toward the centerline of the belt 38. FIG. 6 illustrates a segment of a symmetrical belt 38b which is preferred for capture and stacking of thin sheet objects having narrow width dimensions such as paper currency or checks. The symmetrical finger 39b has first and second side edges 43, 44 that taper symmetrically inward toward the centerline of the belt 58 to be joined by the trailing edge 45. Each of the three slits in the belt 38, needed to form either symmetrical or asymmetric fingers, 39a or 39b, is terminated by stress relief circles 46, four being required for each finger 39. Finger 39 position registry in the assembled apparatus is accomplished by a photoelectric sensing subsystem which scans the moving belt 38 to locate the series of registry apertures 47 which are uniformly distributed in proximity to one edge of the belt 38. Each registry aperture 47 is centered between the base 48 and trailing edge 45 of a finger. With photoelectric sensing and software programs the belt 38 and its multiplicity of capture fingers 39 are advanced by a friction drive and an electric step motor 49. An edgewise view of a segment of a thin film sorting belt 38 is illustrated in FIG. 7. Each finger 39 is biased to project at an acute angle from the inner surface 50 of the continuous belt 38. If the belt 38 is constrained to a small arc of a circle the resulting deformation shifts the finger 39 to project at an acute angle from the outer surface 51 of the continuous belt 38.

The sorting belt 38 may be made from a variety of materials such as plastics or metals. A currently preferred material for sorting belts 38 is polyester film. The polyester film belt 38 is manufactured through the following procedures and steps:

First—A strip of required width and length is cut from a stock sheet of thin film polyester.

Second—The ends of the strip of polyester film are joined by ultrasonic welding to form an endless belt.

Third—Slits and holes are punched in the endless belt for either symmetric or asymmetric finger designs using a punch that spans from a tracking registry hole 47 to the fourth finger 39 removed therefrom along the belt 38. Successive punching is performed along the strip to the location of the beginning punching strip for a continuous belt.

Fourth—Press acute bias angles for each finger in the direction toward the belt's inner surface 50 by a mechanical brake of matching top and bottom dies to crease the polyester film at the base 48 of each finger 39.

One design for office applications uses a preferred belt 38 having twenty four fingers 39, an even number being preferred for the controlling software. The dimensions and number of fingers 39 of the belt 38 may be varied for different applications.

In further reference to FIG. 2, the document sorting and stacking subassembly 52 is offset from the document path 23. The sorting belt 38 encloses the pick roller 40, a belt drive wheel 53, and a belt tensioner assembly 54. An electric step motor 55 is mounted to the underside of the assembly plate 21. Synchronized movement of the sorting belt 38 is actuated by the step motor 55 operating from the underside of the assembly plate 21 through a timing belt 56, an eighteen tooth driving pulley 57 fixed to the armature of the step motor 55 and a seventy-two tooth drive pulley 58 fixed to the shaft 59 of the belt drive wheel 53. The drive wheel 53 includes a polyurethane tire 72 for contact with the sorting belt 38.

The belt tensioner assembly 54 includes the tensioner idler wheel 60 for contact with the sorting belt 38, the idler wheel 60 rotating upon a tensioner floating axle 61 which is forced by dual tensioner springs 62 to maintain the sorting belt 38 in tension. The belt tensioner assembly 54 may be attached to the upper surface of the assembly plate 21 at any one of several stations 63 between the pick roller 40 and belt drive 53 wheels to accommodate documents 35 of differing lengths.

The document stacking apparatus includes the back stop 64 which is fixed to the assembly plate 21, a document guide plate 65 which swings away from the sorting belt 38, through the pivot bar 66 as documents 35 accumulate in the stack. The bar 66 swings about the stacker axle 67 and activates the electric indicating switch 68 when the pocket 71 accumulates a full stack of documents 35.

An electric motor driven muffin type fan 69, mounted to the topside of the assembly plate 21 to the interior of the sorting belt 38, blows air across the belt 38 to force the trailing portions 70 of stacked documents 35 into the pocket 71 so that subsequently arriving documents 35 may freely enter the stacking pocket 71.

The arrival and presence of documents 35 for sorting is sensed by an electro-optical device situated along the document path 23 which includes an emitting lamp 73 for projecting light across the document conveyor belt 29, a reflector 74 for returning a portion of the light from lamp 73 across the conveyor belt 29 to a receiving photoelectric cell 75. The signal developed by the arrival of a document that blocks the emitted and reflected light beams is used to calculate the time of arrival (TOA) at the end of the parking paw 42 where capture of a document may be made. Precise positioning of the sorting belt 38 requires sensing the location of the capture fingers 39. A belt tracking lamp 76 and a belt tracking photocell 77 are assembled to the base plate 21 at a precise location for transmission of light through the belt registry aperture 47 (See FIGS. 5 and 6) where the trailing edge 45 of the preceding fourth capture finger 39 clears the end of the parking paw 42. The adjustment of the belt tracking lamp 76 and photocell 77 relative to the distance between belt registry apertures 47 and the end of the parking paw 42 is critical.

The entry of a captured document 35 into the stacking zone is sensed by the combination of an entry lamp 78 and photocell 79 which are arranged for a light transmission path across the sorting belt which will be broken upon entry of the leading edge and until the trailing edge of the document 35 passes on toward the pocket 71 of stacked documents.

The signals from the conveyor arrival photocell 75, the belt tracking photocell 77, and the entry photocell 79 are used by a microprocessor and digital controller subsystem 19 with appropriate computing software programs that perform the following functional steps:

a. determine system status—Feeder 12 and transport conveyor 14 are on and operating.

b. confirm status of the sorter unit conveyor—conveyor motor 31 and conveyor belt 29 are operating at the specified constant speed.

c. confirm the parking status of the sorting belt 38—its capture finger 39 is constrained by the parking paw 42.

d. sense the designated address, i.e., the single stage sorting and stacking unit 20, for each oncoming document in the transport conveyor 14.

e. determine the epoch for the arrival of the leading edge of a designated document 35 on the unit conveyor belt 29 at the arrival photocell 75.

f. estimate the time-of-arrival of the document leading edge 35 at the capture station at the end of the parking paw 42.

g. initiate acceleration of the parked sorting belt 38 to rendezvous its previously restrained capture finger 39 with the designated oncoming document 35 by releasing the finger's trailing edge 45 into the document path 23.

h. accelerate the sorting belt 38 and captured document 35 into the stacking zone.

i. confirm entry of the document 35 in the stacking region from the entry photocell 79 signal.

j. confirm velocity of the sorting belt 38.

k. predict document 35 time-of-arrival at the stacker pocket back stop wall 64.
l. sense the presence of any follow-on document 35 approaching the capture zone at the end of the parking paw 42.
m. if no follow-on document 35 is present advance the sorting belt 38 to deposit the first captured document 35 now in transit in the stacker pocket 71.
n. stop sorting belt 38 in a parked position with finger 39 restrained by parking paw 42.
o. if a follow-on document 35 is for a distant address, i.e., a subsequent sorter and stacker unit 20 of a multiple unit sorter 10, hold the sorting belt 38 in the parked position to bypass the document 35 to a subsequent unit 20 of the multiple unit sorter 10.
p. if a follow-on document 35 is for this same address, i.e., this local sorting and stacking unit 20, reinitiate the capture procedures (beginning with step e.above) with the previously captured first document 35 being temporarily stopped in its transit to the stacking pocket 71.
q. advance the sorting belt 38 and confirm that all captured documents 35 are deposited in the stacking pocket 71.
r. advance the sorting belt 38 to its parking position for standby status awaiting subsequent documents 35.
s. confirm stacking pocket 71 full status from the full switch 68 signal.
t. on first indication of pocket 71 full status order all systems stop.
u. call service attendant to collect sorted documents 35 from stacking pocket(s) 71 and restart system.

Calibration of each single stage sorting and stacking device 20 requires careful adjustment of the belt tracking photocell assembly 80 to which the tracking lamp 76 and photocell 77 are affixed. Mounting slots 81 permit adjustment along the sorting belt 38. If the distance from the photocell assembly 80 to the end 82 of the parking paw 42 is too short the trailing edge 45 of the belt's 38 capture finger 39 will park out in the unit document path 23 and will catch a document 35 that should pass by. If the distance from the assembly 80 to the parking paw end 82 is too long the capture finger 39 will fail to come out for a document 35 that it should catch. In a preferred embodiment of the invention the design is arranged so that after stripping a captured document 35 in the stacking pocket 71 and detected by the tracking photocell 77, the microprocessor and controller 19 decelerates the belt 38 to park the capture finger 39 beneath the parking paw 42 in four microsteps of the driving stepmotor 49. To capture an identified document 35 the belt 39 is stepped forward eight steps (of the motor 49) to assure location of the finger trailing edge 45 within the document path 23, clear of the parking paw end point 82, in four or five steps of the motor 49 prior to the calculated time of arrival of the advancing document 35. Although other embodiments may vary dimensionally, a means for adjustment and calibration is required.

The invention has been described by way of example of a preferred embodiment from which modifications may be made without departure from our claims which are appended hereto.

We claim:

1. Apparatus for automated sorting and stacking of sheet items, documents, notes, cards, envelopes and the like having a common unit mechanical conveyor for receiving and transporting said sheet items in sequential progression, one after another, at a specified velocity in a defined flow path, and having a multiplicity of like diverting mechanisms distributed along said conveyor in communication with said defined flow path, said apparatus operable by a microprocessor and digital controller, wherein the improvement comprises:
  a. a perforated endless belt for said sorting and stacking of said sheet items comprising a multiplicity of integral capture fingers in said belt that are distributed uniformly along the circumferential length of said belt, said distributed fingers in any straightened segment of said belt are biased to project inward at an acute angle, all in the same direction, in reference to the inner surface of said belt, said fingers in curved segments along the circumference of said belt of sufficiently small forced local radius then shift, by the resultant deformation of said belt, to project outward at acute angles in reference to the outer flat surface of said belt;
  b. a means for shaping said endless belt in said straight segments and in said curved segments of sufficiently small radius for said shift of said capture fingers;
  c. a means for communicating one said curved segment of said endless belt with said conveyor defined flow path for the capture of designated sheet items form said sequential progression by an outward projecting capture finger with trailing edge thereof facing the advancing sheet item;
  d. a means for advancing said endless belt for a transition of said outward projecting fingers in the curved belt segment to inward projecting fingers in a straight belt segment said transition for grasping said sheet items between said finger and said belt outer surface for transport by pulling a section to a stacking pocket; and
  e. a means for initiating and controlling the motion of said endless belt for rendezvous and interception of said sheet items, responsive to a determination that an advancing specific sheet item is to be captured from said sequential progression in the flow of said sheet items in said conveyor path.

2. Apparatus as recited in claim 1, wherein said sorting and stacking belt further comprises:
  a. a thin membrane strip of constant width, comprising materials having substantial resilient attributes, the ends of said strip joined to permanently form said endless belt with said inner and outer surfaces;
  said multiplicity of capture fingers each comprising a pattern of at least two slits extending longitudinally from a root base attachment in said membrane strip to an interconnecting slit comprising a trailing edge of said capture finger, said pattern of longitudinal and interconnecting slits for defining the boundary of said capture finger;
  c. a crease formed at said root base of each said capture finger for said acute angle project in reference to said inner belt surface; and
  d. a means of registry for locating and controlling the positions and movements of said capture fingers during the operation of said apparatus.

3. Apparatus as recited in claim 2, wherein said sorting and stacking belt still further comprises:
  a. a multiplicity of curved perforations in said membrane strip for relieving stress and for durability of said belt, said multiplicity of perforations distributed one at each slit termination, and one at each slit intersection of said multiplicity of belt capture fingers.

4. Apparatus as recited in claim 2, wherein said capture finger registry means comprises:
   a. a longitudinal registry track upon said endless belt;
   b. a multiplicity of distance markers along said registry track, one such distance marker precisely placed with reference to the trailing edge of each capture finger; and
   c. a means of sensing the motion of said registry distance markers passing at a fixed monitoring point within said apparatus.

5. Apparatus as recited in claim 4, wherein said registry track extends the length of said endless belt between an edge thereof and said multiplicity of distributed capture 6. Apparatus as recited in claim 4, wherein said distance markers comprise perforations through the membrane of said 7. Apparatus as recited in claim 6, wherein said means of sensing the motion of said distance markers comprise a photoelectric monitoring subsystem.

8. Apparatus as recited in claim 2, wherein said pattern of slits comprises:
   a. a transverse slit for said capture finger trailing edge;
   b. a first side slit extending longitudinally at an acute angle for convergence toward a first side edge of said belt, said first side slit for connecting said finger trailing edge and said finger root base; and
   c. a second side slit, similar to said first side slit, extending symmetrically at said acute angle for convergence toward the second side edge of said belt, said second side slit for symmetrically connecting said finger trailing edge and said finger root base.

9. Apparatus as recited in claim 2, wherein said pattern of slits comprises:
   a. a transverse slit for said capture finger trailing edge;
   b. a first side slit extending parallel in proximity to a first side edge of said belt, said first side slit for connecting said finger trailing edge and said finger root base; and
   c. a second side slit, extending asymmetrically at an acute angle for convergence toward the second side edge of said belt, said second side slit for asymmetrically connecting said finger trailing edge and said finger root base.

10. Apparatus as recited in claim 2, wherein said thin membrane strip for said sorting and stacking belt comprises a polyester film material.

11. Apparatus, operable by a microprocessor and digital controller, for automated sorting and stacking of sheet items, documents, notes, cards, envelopes and the like, responsive to the flow of said sheet items in sequential progression in a mechanical conveyor, wherein the improvement in a p multiplicity of like diverting and stacking subsystems comprises:
   a. a pocket for the stacking of designated sheet items;
   b. a pick roller assembly arranged for rotation of the roller rim through a plane parallel to the plane of of said sequential progression of sheet items along said conveyor;
   c. a perforated endless belt for capturing and pulling said designated sheet items to said packet comprising:
      an inner surface communicating with said roller rim in that portion of the periphery of said roller that is in near proximity to said conveyor;
      an outer surface communicating with said sequential progression of sheet items; and
      a multiplicity of capture fingers uniformly distributed in the circumferential length of said belt for grasping said sheet items designated for stacking, each said capture finger trailing integrally at an acute angle normally from the inner surface of said belt and trailing integrally at an acute angle from said outer surface of said belt as said belt communicates with said pick roller rim to grasp said designated sheet item between said finger and said belt's outer surface for pulling said sheet item to said stacking pocket;
   d. a tensioning subsystem for said endless belt;
   e. a synchronous belt driving subsystem, responsive to said microprocessor and digital controller, comprising:
      means for positioning said belt to locate one of said capture fingers for rendezvous with said designated sheet item arriving sin said sequential progression; and
      means for advancing said belt for pulling said sheet items to said stacking pocket;
   f. a monitoring subsystem for supply of information to said microprocessor and digital controller, comprising:
      a leading edge arrival sensor for said sheet items of said sequential progression upon said conveyor;
      a stacking pocket entry sensor for captured sheet items;
      a position tracking sensor for capture fingers of said belt; and
      an alarm switch for indicating a full condition for said stacking pocket; and
   g. means for passing non-designated sheet items onward via said conveyor to downstream diverting and stacking subsystems.

12. Apparatus as recited in claim 11, wherein the improvement further comprises:
   a. a fan for clearing the entry way to said stacking pocket for receiving additional sheet items by directing a flow of air against said stacked items.

13. Apparatus as recited in claim 11, wherein said synchronous belt driving subsystem further comprises:
   a. a digitally operable electric step motor;
   b. a drive wheel for said endless belt; and
   c. a synchronous means for coupling the armature of said step motor to said belt drive wheel.

14. Apparatus as recited in claim 11, wherein said means for passing non-resignated sheet items to downstream diverting and stacking subsystems, comprises:
   a. a parking paw, in concert with the positioning of said endless belt by said microprocessor and digital controller, for inhibiting the capture of said non-designated sheet item, said parking paw comprising a tapered appendage interposed between said endless belt and said conveyor in the region of tangency between said coneyor and said endless belt for restraining said projection of capture fingers, of a stationary endless belt, into said sequential progression of sheet items.

15. Apparatus for automated sorting and stacking of sheet, items, documents, notes, cards, envelopes and the like, having a common unit mechanical conveyor for receiving and transporting said sheet items in sequential progression, one after another, at a specified velocity in a defined flow path, and having a multiplicity of like diverting mechanisms distributed along said conveyor and in communication with said defined flow path, said apparatus operable by a microprocessor and digital controller, wherein the improvement in like diverting mechanisms comprises:

a. a sorting subsystem projecting approximately normal from the plane of said conveyor, for capturing specific identified sheet items from said sequential progression, said sorting subsystem comprising:
  a pick roller assembly arranged for rotation of the roller's circumferential surface through a plane parallel to the plane of said defined flow path of said conveyor;
  an endless sorting belt for said sheet items encircling that portion of the periphery of said roller situated between said conveyor and said pick roller assembly;
  a parking paw interposed between said sorting belt and said conveyor in the region of tangency between said conveyor and said roller, said paw for inhibiting capture of sheet items designated for successive sorting subsystems;
  a tensioning subsystem for said endless sorting belt;
  a belt driving subsystem responsive to said microprocessor and digital controller;

b. a stalking subsystem for said sheet items that are separated from said sequential progression by said sorting subsystem, comprising:
  an expandable stacking pocket;
  a backstop of said stacking pocket for stripping sorted sheet items from said sorting belt;
  a guide plate and pivoting bar for said stacking pocket; and
  a fan for directing a flow of air to force stacked sheet items against said guide plate to clear the entry way of said stacking pocket for receiving additional sheet items; and c. a monitoring subsystem for supply of information to said microprocessor and digital controller, said monitoring subsystem comprising:
  a first sensor for establishing the arrival of the leading edge of said sheet items in said mechanical conveyor;
  a second sensor for confirming the entry of said captured sheet items into said stacking pocket;
  a third sensor for tracking the position of said sorting belt relative to said parking paw; and
  a fourth sensor for indicating a fully filled stacking pocket.

* * * * *